United States Patent

[11] 3,622,535

| [72] | Inventors | Robert Z. Greenley<br>St. Louis;<br>Jerry M. Sugerman, Clayton, both of Mo. |
|---|---|---|
| [21] | Appl. No. | 794,386 |
| [22] | Filed | Jan. 27, 1969 |
| [45] | Patented | Nov. 23, 1971 |
| [73] | Assignee | Monsanto Company<br>St. Louis, Mo. |

[54] PROCESS FOR PREPARING MINERAL REINFORCED POLYLACTAM COMPOSITIONS
15 Claims, No Drawings

[52] U.S. Cl. .................................... 260/37 N, 260/78 L
[51] Int. Cl. .................................... C08g 20/18, C08g 51/04, C09c 3/00
[50] Field of Search .......................... 260/37 N, 78 L; 106/308 N

[56] References Cited
UNITED STATES PATENTS

| 3,410,831 | 11/1968 | Hedrick et al. | 260/37 N |
| 3,419,517 | 12/1968 | Hedrick et al. | 260/37 N |
| 3,498,872 | 3/1970 | Sterman et al. | 260/37 N |
| 3,418,268 | 12/1968 | Hedrick et al. | 260/37 N |

*Primary Examiner*—Allan Lieberman
*Attorneys*—Boyden L. Bussard, Joseph D. Kennedy and John D. Upham

ABSTRACT: Improved lactam slurries containing a major amount of a mineral reinforcing agent suitable for conversion to a reinforced polylactam composition by the initiated, anionic polymerization process and essentially containing an effective amount of from about 0.1 to about 1.0 weight percent, based on the mineral, of an adduct prepared by the reaction of (1) a higher alkylbenzenesulfonic acid, wherein the alkyl group contains from nine to 15 carbon atoms, with (2) an ω-aminoalkylenetrialkoxysilane, wherein the alkylene group contains from two to 10 carbon atoms and each of the alkoxy groups contain from one to three carbon atoms. The presence of said adduct acts as a fluidifying agent to provide a lower viscosity slurry at a given mineral concentration enabling better filling of molds in the cast-polymerization process and/or permitting the use of slurry compositions with higher mineral concentrations with processing equipment operating near the upper limit of prior art mineral concentration for any particular mineral-lactam composition.

PROCESS FOR PREPARING MINERAL REINFORCED POLYLACTAM COMPOSITIONS

Polyamides have been produced by the condensation polymerization reaction of essentially equimolecular amounts of a diamine with a dicarboxylic acid, e.g. hexamethylenediamine with adipic acid; or by the condensation polymerization reaction of an ω-aminocarboxylic acid, e.g. ε-aminocaproic acid; or by the hydrolytic polymerization at elevated temperatures usually above 250° C. of a higher lactam, e.g. ε-caprolactam, which in reality is a variation of the immediately preceding process; or by the anionic polymerization of a higher lactam, e.g. ε-caprolactam, in the presence of a base catalyst at temperatures from about 200° C. to 250° C.; and more recently by the rapid, initiated, anionic polymerization of higher lactams, e.g. ε-caprolactam, at temperatures preferably from about the melting point of the lactams but below the melting point of the polylactams (although higher temperatures can be employed), i.e. the polymerization casting process wherein a lactam monomer can be rapidly polymerized with high conversions of 98 percent or more to a solid polylactam object in any suitable mold as taught in U.S. Pat. No. 3,017,391, 3,017,392, 3,018,273, 3,028,369, 3,086,362 and other related art. Subsequently it was found that the benefits of the polymerization-casting technique could be extended to various reinforced polyamide compositions containing fibrous or particulate inorganic fillers wherein the fillers and polyamides were effectively bonded together through the use of various coupling agents as set out in U.S. Pat. No. 3,419,517, issued Dec. 31, 1968, and incorporated herein by reference.

Whereas excellent engineered composite molded structures have been prepared from reinforced polylactams by the polymerization-casting technique, at high loadings of particulate reinforcing agent, the viscosities of the mixed compositions prior to and during the introduction of such compositions into any particular mold is high whereby the further increase in the viscosity caused by the rapid polymerization of the lactam monomer in the hot mold makes it difficult to rapidly and properly fill a complex mold without some reduction in the inorganic filler concentration of such compositions. Accordingly, it is the principal object of this invention to provide improved lactam-inorganic filler compositions containing the other minor but essential components, i.e. coupling agents, base catalysts and/or promoter compounds, and other desired additives, with a lower viscosity for a given concentration of inorganic filler in a particular system. Effecting the aforesaid object enables a more rapid, efficient and complete filling of the complex mold, other conditions being constant, or provides a means of using lactam-inorganic filler compositions having a higher concentration of the inorganic filler reinforcing agent. Other objects and advantages of this invention will be apparent to those skilled in the art from the following disclosure.

It has now been found that the foregoing objects can be realized by the use of an effective amount of from about 0.1 to about 1.0 weight percent based on the inorganic filler, of an adduct prepared by the reaction of a higher alkylbenzenesulfonic acid defined by the formula:

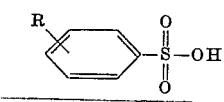

wherein R is an alkyl group containing from 9 to 15 carbon atoms, with an ω-aminoalkylenetrialkoxysilane defined by the formula:

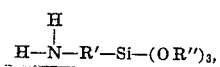

wherein R' is a divalent linking alkylene group containing 2 to 10 carbon atoms and each of the R'' groups contain from 1 to 3 carbon atoms and need not be the same for any one compound. Such adducts thus may be designated by the formula:

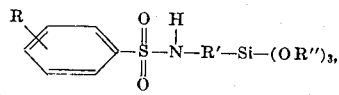

wherein each of R, R' and R'' are defined hereinabove.

Illustrative sulfonic acid reactants are
nonylbenzenesulfonic acid,
decylbenzenesulfonic acid,
undecylbenzenesulfonic acid,
dodecylbenzenesulfonic acid,
tridecylbenzenesulfonic acid,
tetradecylbenzenesulfonic acid,
pentadecylbenzenesulfonic acid, and the like;
and illustrative silane compounds are
2-aminoethylenetrimethoxysilane,
2-aminoethylenetriethoxysilane,
3-aminopropylenetriethoxysilane,
3-aminopropylenetripropoxysilane,
3-aminopropylenetrimethoxysilane,
4-aminobutylenetriethoxysilane,
6-aminohexamethylenetriethoxysilane,
8-aminooctamethylenetrimethoxysilane,
10-aminodecamethylenetripropoxysilane,
3-aminopropylenediethoxymethoxysilane,
2-aminoethyleneethoxydimethoxysilane,
4-aminobutylenedimethoxypropoxysilane,
6-amino-2-ethylhexamethylenetriethoxysilane,
and the like.

The reaction for the preparation of said adduct is an acid-amine reaction to form the sulfonamide linking radical between the two reactants. Thus the aforesaid adducts can be prepared by introducing the particular ω-aminoalkylenetrialkyoxysilane into a closed reaction vessel (fitted with a dropping funnel, stirrer, reflux condenser and a Dean-Stark trap) together with an inert hydrocarbon solvent, e.g. xylene, heating to reflux and adding thereto through the dropping funnel an essentially equimolecular amount of the dry alkylbenzenesulfonic acid in a like inert hydrocarbon solvent. The alkylbenzenesulfonic acid should be dried by refluxing in an inert hydrocarbon solvent boiling above 100° C. prior to its introduction into the reaction vessel. The termination of the condensation reaction preparing the 1:1 adduct can be readily determined by measuring the water collected in the Dean-Stark trap evolved from said reaction and comparing with the theoretical amount required by the particular charge of reactants, e.g. 1 mol of the ω-aminoalkylenetrialkoxysilane reacted with 1 mol of the alkylbenzenesulfonic acid evolves 1 mol of water. When the reaction is complete the hydrocarbon solvent is removed from the reaction mixture by distillation and then by subjecting to vacuum treatment at a temperature and vapor pressure combination which will assure the removal of the hydrocarbon solvent, or the reaction mixture preferably can be stripped under vacuum from the beginning in order to minimize the time and heat exposure of said adduct. The variables of reactants, inert solvents, time, temperature and vapor pressure will be apparent to those skilled in the art from the foregoing disclosure and the illustrative examples set out hereinafter.

Lactams suitable for use in this invention are those containing from four to about 24 or more carbon atoms in the lactam ring and preferably are the higher lactams containing from six to about 12 carbon atoms in the lactam ring and more preferably still the monocyclic higher lactams containing from six to about 12 carbon atoms in the lactam ring including the carbon atom from the single amide group therein. Lactams also may be called cyclic amides and the lactams included in this invention may contain more than one amide group in the cyclic amide ring, may be substituted lactams with inert substituents on other than the amide group, may have such substituents form a divalent linking group to join two different carbon atoms in the same lactam ring, i.e. to form a bicyclic lactam, or the inert divalent linking group may join two nonamide carbon atoms from different lactam rings, i.e. bislactams, and the like. Illustrative lactams thus may be 2-pyrrolidone, 2-piperidone, γ-valerolactam, γ-caprolactam, ε-caprolactam, ε-enantholactam, ζ-enantholactam, **-caprylolactam, θ-nonanolactam, ζ-decanolactam, κ-undecanolactam, λ-dodecanolactam, ξ-pentadecanolactam, o-hexadecanolactam, cyclic hexamethyleneadipamide (14 membered ring), dimeric cyclic hexamethyleneadipamide (28 membered ring), 3-aminocyclohexanecarboxylic acid lactam, 4-aminocyclohexanecarboxylic acid lactam, camphoric acid lactam (wherein the two carbonyl groups are converted to form an amide linking group), phthalimidine, carbostyril, 2,2-bis[5-(ε-caprolactam)]propane, homologs of the foregoing lactams and other related compounds thereof. Copolymers of the foregoing illustrative lactams can also be prepared by using two or more different lactams in the cast-polymerization process. In the preparation of any such copolymer polyamide it is preferred that at least 50 mol percent of the lactams be selected from the monocyclic lactams containing from six to 12 carbon atoms in the lactam ring. Thus, the lactams may be defined by the generic formula

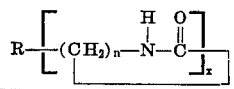

wherein $n$ is an integer from three to 23 and preferably from five to 11, $x$ is an integer from one to four or more, preferably one to two and more preferably still one, and when $x$ is greater than one each value for $n$ need not be the same; $R$ is hydrogen, an inert substituent such as a monovalent hydrocarbon radical, a divalent hydrocarbon radical linking two carbon atoms in the same lactam ring to give a bicyclic lactam, or a divalent hydrocarbon radical linking two carbon atoms from different lactam rings to give a bis-lactam.

The base catalyst can be any basic material sufficiently strong to form an iminium salt of the lactam being polymerized. Common examples of such catalysts are the alkali and alkaline earth metals (e.g., sodium, potassium, lithium, calcium, strontium, barium, magnesium, etc.), either in metallic form or in the form of hydrides, borohydrides, oxides, hydroxides, carbonates, etc. In the case of compounds such as the hydroxides and carbonates, which give off water when reacted with lactams, the bulk of such water must be removed from the polymerization system, e.g., by the application of heat and/or reduced pressures, before the base-catalyzed polymerization can take place. If such water is not removed, the required iminium ion is not stable and hydrolytic polymerization will take place rather than base-catalyzed polymerization. Other effective catalysts are the organo-metallic derivatives of the foregoing metals as well as of other metals. Examples of such organo-metallic compounds are the lithium, potassium, and sodium alkyls such as butyl lithium, ethyl potassium or propyl sodium, or the aryl compounds of such metals such as sodium phenyl. Other suitable organo-metallic compounds are diphenyl magnesium, zinc diethyl, triisopropyl aluminum, diisobutyl aluminum hydride, etc. As a general class, the materials known as Grignard reagents are effective base catalysts for the present polymerization process. Typical of such Grignard catalysts are ethyl magnesium chloride, methyl magnesium bromide, phenyl magnesium bromide, and the like. Other suitable catalysts are sodium amide, magnesium amide and magnesium anilide, as well as numerous others.

Promoter compounds, also called initiator compounds or cocatalysts in the art, or precursors thereof with the lactam monomer may be any of those set out in the patents expressly referred to hereinabove and the related art including N-acyl-lactams, cyclic imides of dicarboxylic acids, N-acylsulfonamides, disulfonamides, N-nitrosoamides, N-nitrososulfonamides, N-acylpyrroles, N-acylindoles, N-acylimidazolides, N-acylpyrazolides, N-acylbenzotriazolides, N-acylcarbazolides, halo-s-triazines and other triazine derivatives, N,N'-di- and trisubstituted ureas and thioureas, N-substituted urethanes, acyl halides, anhydrides, ketenes, organic isocyanates, N,N-dihydrocarbyl carbamyl chlorides, N,N'-substituted carbodiimides, N,N-substituted cyanamides, and the like. As is known in the art, when the promoter compound is formed in situ by reaction with the lactam any byproduct of such reaction should normally be removed from the system or inactivated prior to bringing together with the base catalyst in the presence of the lactam. Thus the acid chlorides evolve hydrogen chloride and the anhydrides evolve carboxylic acids, etc., whereby these byproducts should be removed or inactivated, or additional basic catalyst must be employed to compensate for the catalyst which would be inactivated by the acidic by product. Similarly in utilizing the base catalysts it is normally desirable to effect the reaction between the catalyst and the lactam prior to introducing into the polymerization system, e.g. sodium or sodium hydride evolve hydrogen in the formation of sodium caprolactam and the hydrogen gas should be removed possibly by subjecting the reaction mixture to reduced pressure, in order to assure void-free polylactam compositions.

The base catalyst concentration can range from a small fraction of 1 percent, e.g. 0.01 percent, to as much as 5, 10, 15 or 20 mol percent, based on the lactam monomer, but the preferred catalyst concentrations generally will vary from about 0.05 to about 2 mol percent and more preferably still from about 0.1 to about 1 mol percent. The promoter compound concentration also can range from about 0.01 to about 5 or as high as 20 mol percent, based on the lactam monomer, but generally will range from about 0.05 to about 2 mol percent and preferably will range from about 0.1 to about 1 mol percent. Depending on the choice of promoter compound the polymerization of the lactam monomer to the corresponding polylactam can be very rapid in the presence of the base catalyst and the promoter compound. Accordingly these three components are not brought together until just prior to or during the introduction of the complete polymerization mixture into the desired mold. However the base catalyst can be mixed with a portion of the lactam and other additives and the promoter compound can be mixed with another portion of the lactam and other additives and then such two portions can be mixed together just prior to or during the introduction thereof into the mold. Other modifications of the procedure for mixing the component parts of the reaction mixture will be apparent to those skilled in the art.

As generally noted hereinabove the initiated, anionic polymerization of lactams generally is effected at temperatures from about the melting point of the lactam monomer being polymerized to about the melting point of the corresponding polylactam produced therefrom. It should be understood however that higher temperatures above the melting point of the polylactam may be used, if desired, e.g. up to about 250° C., and so long as such higher temperatures do not decompose the monomer, catalyst, promoter compound, other essential additives which may be present, or the polylactam product, the initiate anionic polymerization process still will be advantageous over the earlier processes in effecting a more rapid polymerization of the lactam monomer to the polylactam product. Furthermore it will be understood by those skilled in the art that the polymerization of lactam monomers to the corresponding polylactam products are exothermic reactions whereby the temperature of any particular reaction mixture will normally rise above the temperature employed to initiate the polymerization reaction, e.g. the temperature rise in the caprolactam system may be of the order of about 40° to 50° C., if no heat is removed from the system. However, since in practice, heat is evolved from the reaction mixture and mold, the maximum temperature rise in the system will be somewhat less than that set out above. Also such temperature rise will depend on the initiating temperature employed, the relative amount and kind of fillers and/or reinforcing agents present in the system, the mass of the molded object, the mass and heat content of the mold, the environment of the mold, etc. Accordingly, the choice of initiating temperature for any particular system will depend on the lactam monomer, base catalyst, promoter compound, fillers and/or reinforcing agents, the shape, size and material of construction of the mold, as well as other variables. However within the broad temperature ranges set out above initiating temperatures of from about 130° C. to about 200° C., or from about 140° C., to about 190° C., and preferably from about 150° C. to about 180° C. are employed for the ε-caprolactam system. To effect such initiation one or both of the component parts containing the base catalyst and the promoter compound can first be heated to the desired temperature, rapidly mixed and introduced into the desired mold. Usually the mold is preheated sufficiently to preclude chilling the reaction mixture with adverse effects on the viscosity thereof and resultant poor filling of complex molds particular with high loadings of fillers and/or reinforcing agents. Alternatively the mold may be preheated to a sufficient degree to initiate the polymerization of the reaction mixture, or the reaction mixture may be introduced into the unheated mold and both mold and contents heated in an oven or by some other suitable means. From the foregoing remarks the combination of conditions used to initiate the polymerization of the lactam can be varied over a considerable range within the limits disclosed herein together with the prior knowledge in this field by those skilled in the art. Additionally, as noted above and in the pertinent related art the initiated, anionic polymerization of lactam monomers to polylactam products is carried out under substantially anhydrous conditions.

The inorganic fillers useful in this invention together with the suitable coupling agents are the fillers set out in U.S. Pat. No. 3,419,517, supra, e.g. minerals, metals, metal oxides, metal salts such as metal aluminates and metal silicates, other siliceous materials and mixtures thereof preferably characterized as having a water solubility of not more than about 0.15 gram filler per liter of water at room temperature, a Young's modulus of elasticity at least twice that of the polylactam base and preferably about $10^7$ p.s.i. or greater, and a Moh hardness of at least four. Particulate metal silicates, other siliceous materials and mixtures thereof comprising at least 50 weight percent of the total reinforcing agent present in the final composition are particularly preferred as reinforcing agents in this invention. However, other substances such as alumina, $Al_2O_3$, which are not easily coupled to a polyamide by means of coupling agents employed herein, can nevertheless be used as a reinforcing component either singly or preferably combined with other minerals which are more susceptible to coupling, and more preferably combined in minor amounts, i.e. percentages of less than 50 percent of the total reinforcing material. An example of such a material useful in the production of a reinforcing agent, with which alumina can be mixed, is feldspar. Feldspar can be converted into one of the preferred reinforcing agents of this invention and a feldspar-alumina mixture is also useful. Other materials particularly preferred for conversion into reinforcing agents include wollastonite, which is a calcium metasilicate; mullite, and aluminum silicate; calcium magnesium silicates; and an acicular aluminum silicate, $Al_2SiO_5$. Other useful inorganics which can be converted into reinforcing agents include quartz and other forms of silica such as silica gel, carbon black, graphite, cristobalite, calcium carbonate, etc.; metals such as aluminum, tin, lead, magnesium calcium, strontium, barium, titanium, zirconium, vanadium, chromium, manganese, iron, cobalt, nickel, copper and zinc; metal oxides in general such as oxides of aluminum, tin, lead, magnesium, calcium, strontium, barium, titanium, zirconium, vanadium, chromium, manganese, iron, cobalt, nickel, copper and zinc; heavy metal phosphates, sulfides, and sulfates, and basic mineral and mineral salts such as spodumene, mica, montmorillonite, kaolinite, bentonite, hectorite, beidellite, attapulgite, chrysolite, garnet, saponite and hercynite.

Particularly preferred are those inorganic siliceous materials which have a three-dimensional crystal structure as opposed to a two-dimensional or planar crystal configuration. These siliceous materials are also characterized by a somewhat refractory nature with a melting point above about 800° C., a Mohs' hardness of at least 4, and a water solubility of less than 0.1 gram per liter. Examples of preferred siliceous materials include minerals such as feldspar, quartz, wollastonite, mullite, kyanite, chrysolite, cristobalite, crocidolite, acicular aluminum silicate having the formula $Al_2SiO_5$, spodumene and garnet. These minerals are especially desirable for use in reinforced polylactam compositions for a number of reasons. For instance, they provide a composition with better abrasion resistance, flexural strength and modulus, tensile strength and modulus, impact resistance, resistance to heat distortion and resistance to thermal expansion than do conventional clay fillers and inorganic pigments such as whiting. Further, the minerals described above provide higher loading levels than can be achieved with glass fibers, an important economic consideration. In addition, highly loaded lactam monomer slurries can be directly cast into a final polymerized form, thereby eliminating several processing steps necessary with glass fiber-reinforced compositions.

Metals have been suggested above as suitable reinforcing agents. In addition to providing high-strength, reinforced polymeric compositions, the use of certain metals such as copper, silver, iron and others can provide certain important auxiliary advantages. Moderate to high-concentrations of metals can make the polymeric composite electrically conductive, thereby rendering the composite suitable for an electroplating operation wherein the composite can be electroplated with a thin coat of a metal such as chromium, silver, gold, etc. Or the use of iron or steel as a reinforcing agent can give the polymeric composite magnetic properties if the particles are oriented within the composition.

Inorganic filler materials useful herein are referred to as particulate. The term particulate as used in this disclosure refers to granular, platelike and acicular particles having a length to diameter ratio ($l/d$) up to about 25 to 1. Preferably the inorganic fillers useful herein have an $l/d$ ratio up to about 20 to 1, and more preferably from about 1 to 1 up to about 15 to 1. In contrast, the term fibrous refers to particles whose $l/d$ ratios are greater than 25 to 1, and usually are greater than 50 to 1.

Several characteristics of fillers have an effect on the maximum attainable loading of the composition. When the reinforced composition is produced by casting a monomer-reinforcing agent mix directly into a mold where the monomer is polymerized, the maximum content of reinforcing agent is limited primarily by the viscosity of the unpolymerized mixture, i.e. too high a concentration of reinforcing agent produces mixtures too viscous to cast or mold. The limitation imposed by viscosity is in turn dependent to some extent upon the shape of the particulate filler. That is, spherical particles do not increase the viscosity of the monomer mix as much as highly acicular particles. By choosing particulate fillers of suitable shape, it is possible to modify the viscosity of the monomer mix and prepare castable monomer mixtures which can be used to produce polymeric compositions containing a very large amount of reinforcing agent.

Another factor which has an effect upon the upper limit of reinforcing agent concentration is the particle size distribution of the filler. A wide distribution of particle sizes provides a composition with a small amount of voids or spaces between the particles, thereby requiring less polymer to fill these spaces and bind the particles together. Regarding granular particle size, generally particles which pass through a 60 mesh screen (250 microns) are small enough to be used in the compositions of this invention although particles as large as 1,000 microns (18 mesh) or more can be used with equal or nearly equal success; with regard to a lower limit on particle size, particles as small as 0.5μ have been successfully employed and smaller particles in the range of 100 to 200 mμ can also be used. More descriptive of suitable filler particles than limits on particle size is a specification of particle size distribution. A suitable wide particle size distribution is as follows:

| | Percent |
|---|---|
| 250μ or less (60 mesh) | 100 |
| 149μ or less (100 mesh) | 90 |
| 44μ or less (325 mesh) | 50 |
| 5μ or less | 10 |

A narrower distribution also suitable for use in this invention is:

| | Percent |
|---|---|
| 62μ or less (230 mesh) | 100 |
| 44μ or less (325 mesh) | 90 |
| 11μ or less | 50 |
| 8μ or less | 10 |

A relatively coarse mixture useful in this invention has the following particle size distribution:

| | percent |
|---|---|
| 250μ or less (60 mesh) | 100 |
| 149μ or less (100 mesh) | 90 |
| 105μ or less (140 mesh) | 50 |
| 44μ or less (325 mesh) | 10 |

A finely-divided mixture has the following particle size distribution:

| | Percent |
|---|---|
| 44μ or less (325) | 100 |
| 10μ or less | 90 |
| 2μ or less | 50 |
| 0.5μ or less | 10 |

Other typical particle size distributions of reinforcing minerals used in this invention include:

| | Percent |
|---|---|
| Wollastonite: | |
| 75μ or less (200 mesh) | 100 |
| 44μ or less (325 mesh) | 99.7 |
| 11μ or less | 50 |
| 1μ or less | 8 |
| Feldspar: | |
| 50μ or less | 100 |
| 40μ or less | 90 |
| 14μ or less | 50 |
| 10μ or less | 38 |
| 3μ or less | 10 |

These figures regarding particle size distribution should not be construed as limiting since both wider and narrower ranges of distribution will also be useful as well as both coarser and finer compositions. Rather these figures are intended as representative illustrations of filler compositions suitable for use in the reinforced polymeric compositions of this invention.

Proper combination of the two variables of particle shape and particle size distribution, together with a satisfactory processing technique, permits the preparation of molded polymeric compositions containing as much as 90 percent by volume or more reinforcing agent. The lower limit of reinforcing agent concentration is restricted insofar as it is necessary to have sufficient agent present to provide the extraordinary improvement in mechanical properties achieved by the compositions of this invention. The minimum level of reinforcing agent required to provide compositions with properties significantly superior to prior art compositions is about 25 percent by volume.

Suitable values, therefore, for reinforcing agent concentration in the finished compositions range from about 25 to about 90 percent by volume of the total composition. The above range corresponds approximately to about 45 to about 95 percent by weight using a filler density of 2.7 and a polymer density of 1.1. A preferred range of filler concentration is from about 33 to about 67 percent by volume or about 55 to about 84 percent by weight.

In addition, a small amount of fibrous material may be incorporated into a polymer system if the amount of granular or acicular material is reduced by some proportionately larger amount. For example, 2 or 3 percent by volume, based on the total reinforced composition, of glass fibers about 0.5 inch in length can be incorporated into a monomer slurry containing about 30 to 33 percent by volume granular feldspar. Similar quantities of chopped asbestos fibers or other fibrous materials can also be used. The resultant slurry can be cast about as readily as a monomer slurry containing 40 percent by volume granular feldspar. Alternatively, if pourability is not required, larger amounts of fibrous material can be included in the composition, thereby reinforcing the final product to an even greater extent.

Whereas the ω-aminoalkylenetrialkoxysilane moieties of the 1:1 viscosity improver adducts also may function as coupling agents in the present invention, it is preferred that a specific coupling agent per se be employed together with such adduct. The coupling agents can be any of those set out in U.S. Pat. No. 3,419,517, supra, and preferably are those related to or defined by the scope of the disclosed ω-aminoalkylenetrialkoxysilanes employed to prepare the viscosity improver adduct of this invention. The weight ratio of coupling agent to filler can be from about 0.1 to about four parts coupling agent per 100 parts filler, based on the inorganic filler, and preferably from about 0.2 to one part coupling agent per 100 parts filler, i.e. 0.2 to 1 weight percent of coupler based on the inorganic filler. Furthermore at least about 15 mol percent of the total coupling agent used in the present process should be that contained in the ω-aminoalkylenetrialkoxysilane moiety of the 1:1 viscosity improver adduct of this invention.

As disclosed in the reference patent the coupling agent appears to effect covalent chemical bonding between the polylactam and inorganic filler whereby with the presence of such coupling agent the inorganic filler more properly is defined as an inorganic reinforcing agent in view of the improved properties over the polylactam per se and comparable filled, but uncoupled polylactam systems. Thus the bond between the polylactam continuous phase and the inorganic reinforcing agent discontinuous phase is sufficiently strong that particulate inorganic material may be used in much the same way as glass fiber and other fibrous materials have been used to prepare reinforced compositions, wherein much of the improved strength properties formerly were merely the effect of the mechanical strength of the embedded fibrous material similar to the relationship of steel rods embedded in concrete. From the foregoing remarks it will be seen that the inorganic reinforced polylactam compositions may be considered as unitary inorganic-organic block copolymer systems. In contradistinction thereto the inorganic filled systems, wherein the particulate inorganic filler is employed essentially as a diluent to the polymer composition and cannot be employed at high-loading values without detrimental effects to the properties of the polymer composition, are nonunitary mixtures of components.

Other illustrative inert hydrocarbon solvents in addition to the xylenes which can be employed in the preparation of the viscosity depressant adducts are octane, nonane, decane, undecane, dodecane, tridecane, tetradecane, toluene, mesitylene, cumene, tetralin, decalin, 1,4-dimethylcyclohexane, diphenylmethane, biphenyl, and the like. Additionally various inert halogen-substituted, e.g. chlorosubstituted, hydrocarbon compounds can be used in a similar manner. The solvent should have a boiling point above 100° C. to effect the removal of any water from the system and preferably up to about 150° C. although higher temperatures can be employed, particularly when the reaction is carried out under reduced pressure, or up to a temperature which does not deleteriously effect the particular reactants or adduct products. Additionally said reaction preferably should be carried out in an inert atmosphere, e.g. nitrogen and the like. Finally it is desirable to use relatively freshly prepared viscosity depressant adducts, since it was found that lengthy storage of the adduct prior to use in the inorganic filler-lactam slurry did not give as significant decrease in viscosity as the fresher material.

In the following examples the viscosity in seconds is a comparative relative flow time for a given volume of the slurry composition to discharge from a linear graduated cylindrical tube of uniform cross section when said tube is held in a vertical position in a normal gravitational field. Said graduated tube was prepared by cutting off a 5-ml. measuring pipette at the last graduation mark. Said tube used in the examples had an inside diameter of about 5.92 mm. and the graduated section thereof had a length of about 184 mm.

The following specific examples are given to further illustrate the invention and the best mode contemplated for carrying out said invention, but it should be understood that the invention is not limited to all details described therein. Accordingly, various alternative materials, procedures, and limits will be apparent to one skilled in the art from the foregoing generic disclosure.

EXAMPLE 1

To 235 g. of molten ε-caprolactam in a reaction vessel was added 315 g. 10-micron microcrystalline silica filler, and 1.56 g. (1.7 ml.) γ-aminopropyltriethoxysilane coupling agent, the slurry mixture heated at 180° C. and 50 g. of the ε-caprolactam topped off. Then the slurry mixture was cooled to 150° C. and 1.92 g. (1.57 ml.) 80:20 mixture of 2,4- and 2,6-tolylenediisocyanate promoter compound was added thereto at 150° C. and mixed for about 2 minutes. The clean, dry viscosity pipette described above was warmed to 125° C., a 5-ml. sample of the slurry mixture drawn therein and five replicate efflux times found to be 2.5, 2.6, 2.6, 2.7, and 2.4 seconds, for an average of 2.6 seconds at 150° C. and a similar evaluation of five replicate efflux times at 130° C. was found to be 5.1, 4.9, 4.6, 6.0, and 5.1 seconds, for an average of 5.1 seconds.

EXAMPLE 2

A slurry mixture was prepared in the same manner and with the same components and amounts as set out in example 1, except that 2.5 g. dodecylbenzenesulfonic acid was added prior to topping off the 50 g. caprolactam at 180° C. The comparable relative viscosities using the same viscosity pipette were 1.2, 1.2, 1.2, 1.4, and 1.4 seconds, for an average of 1.3 seconds at 150° C. and 2.4, 2.6, 2.4, 2.1, and 2.2 seconds, for an average of 2.3 seconds at 130° C. From the foregoing it will be seen that the addition of the minor amount of dodecylbenzenesulfonic acid to the slurry mixture reduced the relative viscosity at 150° C. from 2.6 seconds to 1.3 seconds and at 130° C. from 5.1 seconds to 2.3 seconds, i.e. based on the average viscosity of the slurry mixture of this example respectively effected reductions of 100 percent and 123 percent at 150° C. and 130° C.

To the aforesaid slurry mixture 8.3 ml. of sodium caprolactam catalyst dissolved in N-methylpyrrolidone at 110° C. (11 millimols sodium caprolactam per mol caprolactam) was added, uniformly mixed therein, and the slurry mixture cast into a ⅛-inch sheet mold at 190° C. Said slurry mixture was held in the mold at 190° C. until it set to a solid reinforced mineral-polycaprolactam composition. Said set time was observed to be from about 30 to about 45 minutes.

EXAMPLE 3

A mixture of 50 g. dodecylbenzenesulfonic acid and 200 ml. xylene were charged to a 500-ml. boiling flask fitted with a reflux condenser and a Dean-stark trap and said mixture heated at reflux until all water had been removed from the system (0.2 ml.). A second boiling flask fitted with a dropping funnel, a reflux condenser, and a Dean-Stark trap was set up and 33.8 g. of γ-aminopropyltriethoxysilane and 150 ml. of xylene added thereto and said mixture heated to reflux to remove all water from the system. Then the dry dodecylbenzenesulfonic acid in xylene from the first flask was introduced into the second flask through the dropping funnel over a time of about 2 hours and subsequent thereto the bulk of the xylene solvent was distilled off by removing through the Dean-Stark trap, then all residual xylene was stripped from the 1:1 reaction mixture of dodecylbenzenesulfonic acid: γ-aminopropyltriethoxysilane adduct under vacuum at 100° C., and said adduct recovered.

EXAMPLE 4

To 235 g. of molten ε-caprolactam in a reaction vessel was added 315 g. 10-micron microcrystalline silica filler, and 3.57 g. of the adduct product from example 3, supra, (equivalent to 0.5 weight percent silane coupler moiety in said adduct based on the silica mineral filler). The slurry mixture was heated to 180° C. and 50 g. of the ε-caprolactam topped off, then the slurry mixture was cooled to 150° C. and 1.92 g. (1.57 ml.) 80:20 mixture of 2,4- and 2,6-tolylenediisocyanate promoter compound was added thereto at 150° C. and mixed for about 5 minutes. In similar manner to examples 1 and 2 the comparable relative viscosities using the same viscosity pipette were 2.0, 1.6, 1.3, 1.6, and 1.4 seconds, for an average of 1.6 seconds at 150° C. and 3.1, 3.1, 2.9, 2.9, and 3.2 seconds, for an average of 3.0 seconds at 130° C. Whereas said relative viscosities are materially superior to example 1 and slightly greater than example 2, it should be recognized that the concentration of the dodecylbenzenesulfonic acid moiety of the said adduct is also slightly less than the concentration of dodecylbenzenesulfonic acid in example 2, whereby a slightly greater relative viscosity reasonably might be expected. To the aforesaid slurry mixture 8.3 ml. of sodium caprolactam catalyst dissolved in N-methylpyrrolidone at 110° C. was added in the same manner as example 2, uniformly mixed therein, and the slurry mixture cast into a ⅛-inch sheet mold at 190° C. The slurry mixture gelled very rapidly and was set within 5 minutes in contradistinction to the 30 to 45 minutes of example 2.

EXAMPLE 5

In similar manner and with the same components and amounts as set out in example 4, except that 1.56 g. (1.7 ml.) of γ-aminopropyltriethoxysilane coupler and 2.5 g. of sodium dodecylbenzenesulfonate were directly added to the 235 g. ε-caprolactam and 315 g. 10-micron microcrystalline silica filler (i.e. the dodecylbenzenesulfonic acid was neutralized as the sodium salt so the acid function could not inhibit the polymerization reaction as in example 2 and the 1:1 adduct would not be formed in situ) in place of the 1:1 adduct, the comparable relative viscosities using the same viscosity pipette were 3.6, 3.0, 2.7, 2.5, and 2.6 seconds, for an average of 2.9 seconds at 150° C. and 5.3, 6.5, 5.8, 6.1, and 6.3 seconds, for an average of 6.0 seconds at 130° C. and the set time was observed to be about 1 minute. It will be seen that the relative viscosity of the slurry mixture of this example is inferior to that of the original slurry mixture of example 1 without any viscosity depressant additive therein to the extent of being about 11.5 percent and 17.7 percent greater respectively at 150° C. and 130° C.

EXAMPLES 6 TO 10

Using the same procedure, components and amounts as example 4, supra, except for (a) the relative amounts of the adduct of example 3 and (b) together with varying amounts of free γ-aminopropyltriethoxysilane coupling agent, the comparative average relative viscosities of the slurries using the same viscosity pipette and the subsequent set times after addition thereto of the basic sodium caprolactam catalyst were as follows:

| Example: | g. adduct | g. coupler | Relative viscosity, seconds at— 150° C. | 130° C. | Set, seconds |
|---|---|---|---|---|---|
| 6 | .5 | 1.35 | 2.6 | 5.2 | 70 |
| 7 | 1.0 | 1.18 | 1.8 | 3.8 | 60 |
| 8 | 1.0 | 1.35 | 1.8 | 2.9 | 70 |
| 9 | 1.5 | .92 | 1.3 | 2.0 | 80 |
| 10 | 1.92 | .73 | 1.3 | 2.2 | 80 |

EXAMPLE 11

In similar manner to example 4 200 g. of molten $\epsilon$-caprolactam, 88 g. 10-micron microcrystalline silica filler, 262 g. 200-mesh silica filler, and 2 g. of the adduct of example 3 were heated together and 50 g. of caprolactam topped off at 180° C., cooled to 150° C. and 1.6 g. (1.31 ml.) 80:20 mixture of 2,4- and 2,6-tolylenediisocyanate promoter compound mixed therein for 5 minutes. The relative viscosities using the same viscosity pipette were 1.7, 1.7, 1.7, 1.7, and 1.7 seconds, for an average of 1.7 seconds at 150° C. and 3.6, 3.5, 3.1, 3.5, and 3.1 seconds, for an average of 3.4 seconds at 130° C. Then 6.7 ml. sodium caprolactam at 110° C. was added and uniformly mixed therein and the slurry mixture cast into a ⅛-inch sheet mold at 190° C. The set time was 70 seconds.

EXAMPLE 12

In a related experiment to example 11, supra, 200 g. $\epsilon$-caprolactam, 88 g. 10-micron microcrystalline silica filler, 262 g. 200-mesh silica filler, and 0.22 g. (0.24 ml.) $\gamma$-aminopropyltriethoxysilane coupler heated together at 160° C. for coupling, cooled to 130° C. and 1.5 g. of the adduct of example 3 added. Then 50 g. caprolactam topped off at 180° C., cooled to 150° C. and 1.6 g. (1.31 ml.) 80:20 mixture of 2,4- and 2,6-tolylenediisocyanate promoter compound mixed therein for 5 minutes. The relative viscosity using the same viscosity pipette were 1.6, 1.6, 1.4, 1.6, and 1.5 seconds, for an average of 1.5 seconds at 150° C. and 2.0, 2.1, 2.4, 2.5, and 2.5 seconds, for an average of 2.3 seconds at 130° C. Then 6.7 ml. sodium caprolactam at 110° C. was added and uniformly mixed therein and the slurry mixture cast into a ⅛-inch sheet mold at 190° C. The set time was 60 seconds.

EXAMPLES 13 AND 14

In examples 6 and 10 when both adduct and coupler were employed in each case the adduct was added first followed by the addition of the coupler with the modification in example 8 that one-half, i.e. 0.5 g., of the adduct was added first then the coupler was added followed by a second increment of 0.5 g. adduct. To determine whether the order of addition of the adduct-coupler and coupler per se had any material effect on the process 235 g. $\epsilon$-caprolactam, 315 g. 10-micron microcrystalline silica filler, and 0.92 g. (1.0 ml.) $\gamma$-aminopropyltriethoxysilane coupling agent were heated together to 170° C., then 1.5 g. of freshly prepared adduct was added thereto. With the addition of the adduct there was an immediate and dramatic reduction in slurry viscosity. The slurry was heated to 180° C. and 50 g. caprolactam topped off, the slurry cooled to 150° C., 1.92 g. (1.57 ml.) 80:20 mixture of 2,4- and 2,6-tolylenediisocyanate promoter compound mixed therein for 5 minutes, 8.3 ml. sodium caprolactam at 110° C. uniformly mixed therein and the slurry mixture cast into a ⅛-inch sheet mold at 190° C. The set time was 55 seconds.

A similar experiment was run in the same manner as the preceding paragraph except that 1.5 g. of freshly prepared adduct was added first to the caprolactam and silica filler and the mixture heated to 170° C. The fluidity of the slurry mixture was observed to be excellent. Then 0.92 g. (1.0 ml.) of the coupler was added and the viscosity of the slurry rose for a short time and then returned to the earlier observed excellent fluidity. However the fluidity of this mixture did not appear to be quite as good as the slurry prepared in the prior experiment. This experiment was then concluded in the same manner as the preceding experiment and the set time found to be 60 seconds.

From the foregoing experiments it was concluded that the order of addition was not critical although the procedure involving the addition of the coupler per se followed by the addition of the adduct gave better results and is the preferred embodiment of this invention.

We claim:

1. A process for preparing inorganic filler-reinforced polylactam compositions comprising treating up to about 90 percent by volume of the total composition of a particulate inorganic filler material having a Young's modulus of elasticity at least twice that of the polylactam base and a Mohs' hardness of at least 4 with an organosilane coupling agent and conducting the anionic polymerization of a lactam monomer having from 4 to about 24 carbon atoms under substantially anhydrous conditions an in the presence of an effective promoter compound, said filler-coupler component, and essentially from about 0.1 to about 1.0 weight percent based on the inorganic filler of the viscosity modifying adduct prepared by the essentially equimolecular reaction of (a) a higher alkylbenzenesulfonic acid, wherein the alkyl group contains from 9 to 15 carbon atoms, with (b) an $\omega$-aminoalkylenetrialkoxysilane coupler agent, wherein the divalent alkylene group contains from 2 to 10 carbon atoms and each of the alkoxy groups contain from 1 to 3 carbon atoms, and at least 15 mol percent of the total coupling agent employed is contained in said adduct.

2. The process of claim 1, wherein the lactam monomers contain from 6 to 12 carbon atoms in the lactam ring.

3. The process of claim 2, wherein at least 50 mol percent of the lactam monomers is $\epsilon$-caprolactam.

4. The process of claim 1, wherein the inorganic filler material is a particulate mineral having a water solubility of less than 0.15 gram per liter, and passes a 60-mesh screen.

5. The process of claim 4, wherein the mineral is a siliceous material.

6. The process of claim 5, wherein the mineral is silica.

7. The process of claim 5, wherein the mineral is wollastonite.

8. The process of claim 5, wherein the mineral is feldspar.

9. The process of claim 2, wherein the adduct is prepared by the essentially equimolecular reaction of dodecylbenzenesulfonic acid with $\gamma$-aminopropyltriethoxysilane.

10. The process of claim 9, wherein the inorganic filler material is a particulate mineral having a water solubility of less than 0.15 gram per liter, and passes a 60-mesh screen.

11. The process of claim 10, wherein at least 50 mol percent of the lactam monomers is $\epsilon$-caprolactam.

12. The process of claim 10, wherein the lactam monomer is $\epsilon$-caprolactam.

13. The process of claim 12, wherein the inorganic filler is silica.

14. The process of claim 12, wherein the inorganic filler is wollastonite.

15. The process of claim 12, wherein the inorganic filler is feldspar.

* * * * *

UNITED STATES PATENT OFFICE

CERTIFICATE OF CORRECTION

Patent No. 3,622,535    Dated November 23, 1971

Inventor(s) Robert Z. Greenley and Jerry M. Sugerman

It is certified that error appears in the above-identified patent and that said Letters Patent are hereby corrected as shown below:

In The Specification:

Column 3, line 7, "**-caprylolactam" should read --- $\eta$-caprylolactam ---.
See specification, page 5, line 31.

Column 3, line 8, "$\zeta$-decanolactam" should read --- $\iota$-decanolactam ---.
See specification, page 6, line 1.

Column 4, line 63, "initiate" should read --- initiated ---.

Signed and sealed this 9th day of January 1973.

(SEAL)
Attest:

EDWARD M. FLETCHER, JR.
Attesting Officer

ROBERT GOTTSCHALK
Commissioner of Patents